United States Patent Office 2,976,906
Patented Mar. 28, 1961

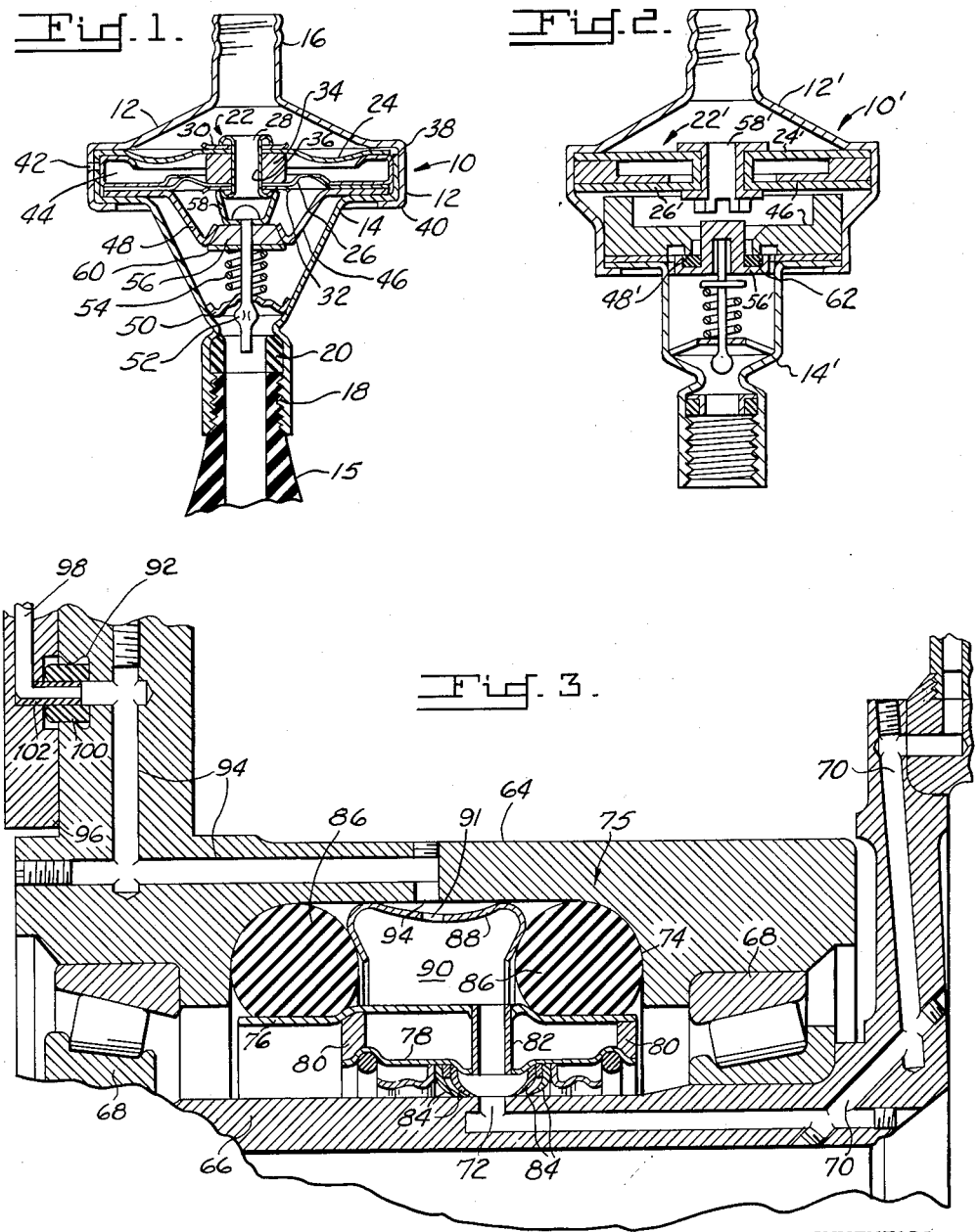

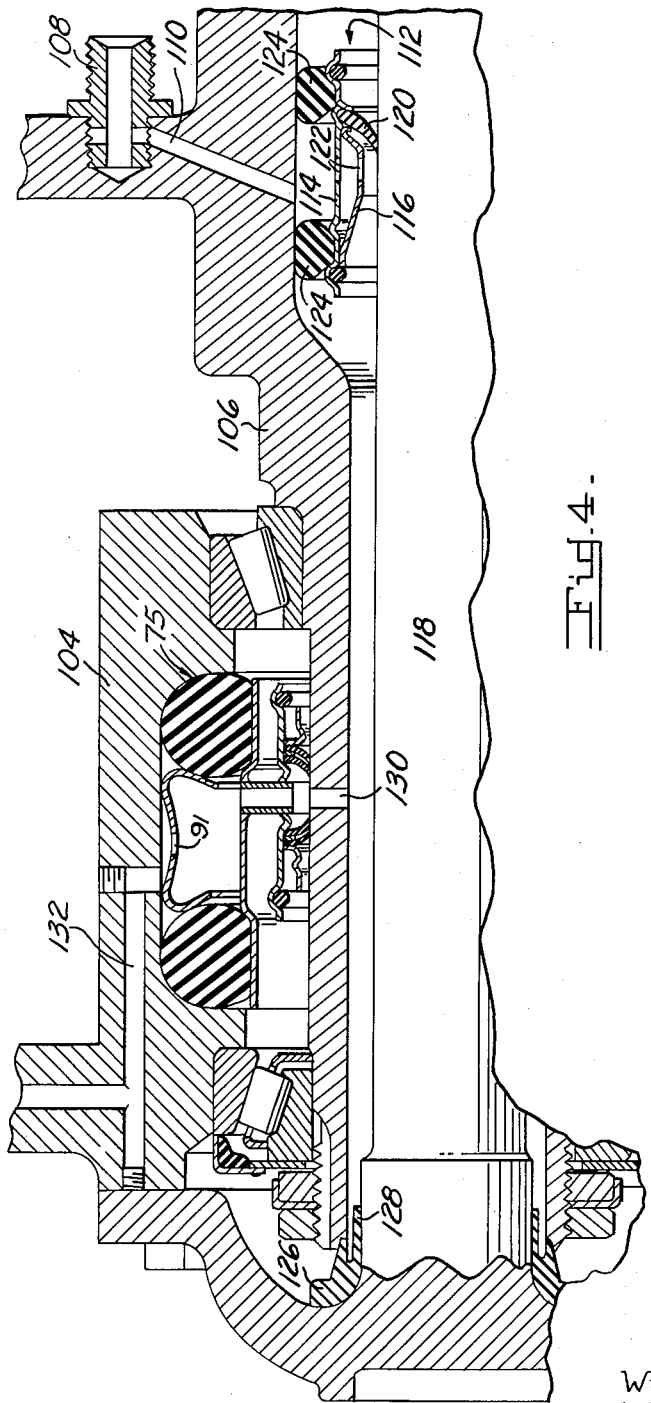

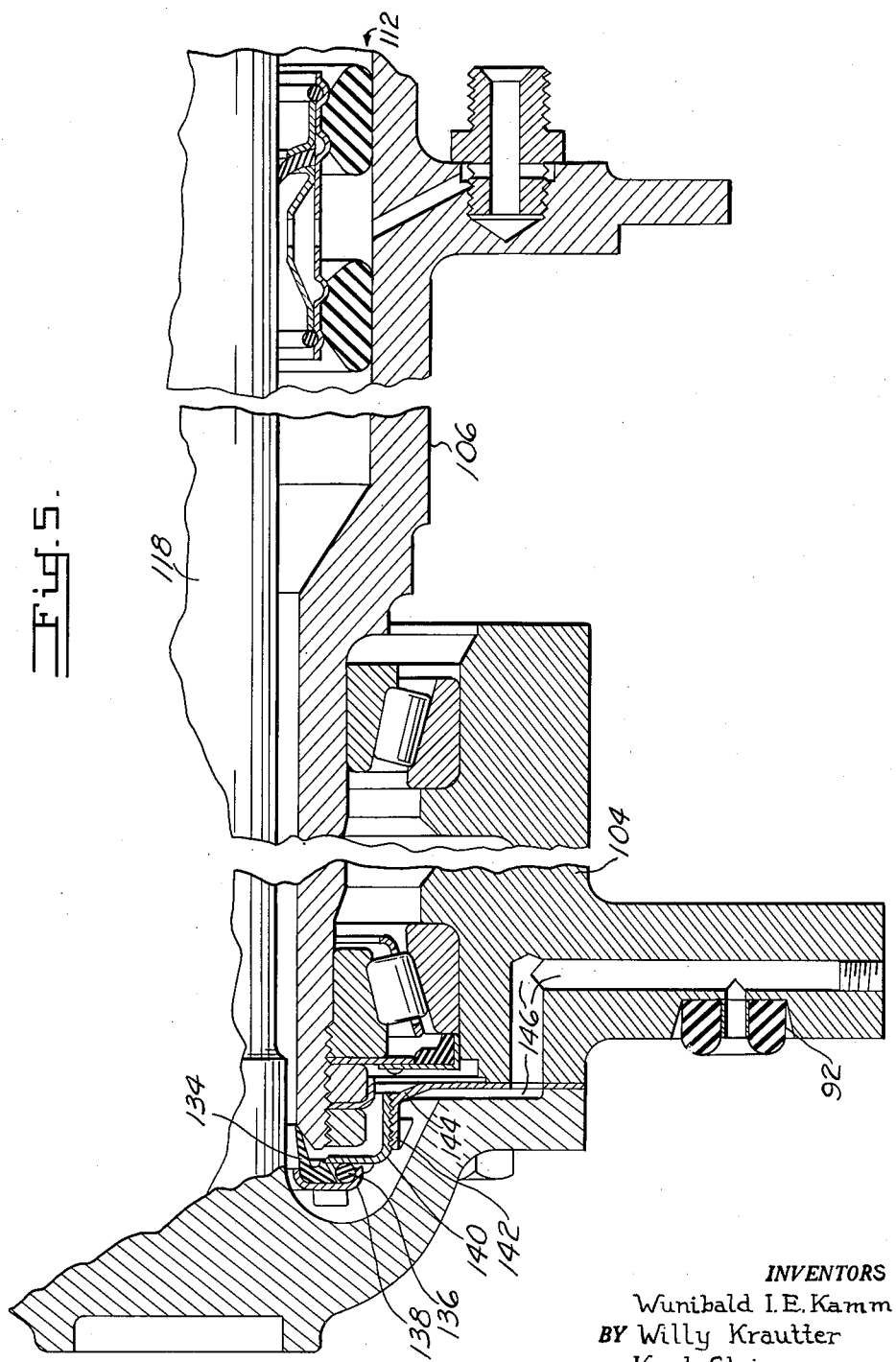

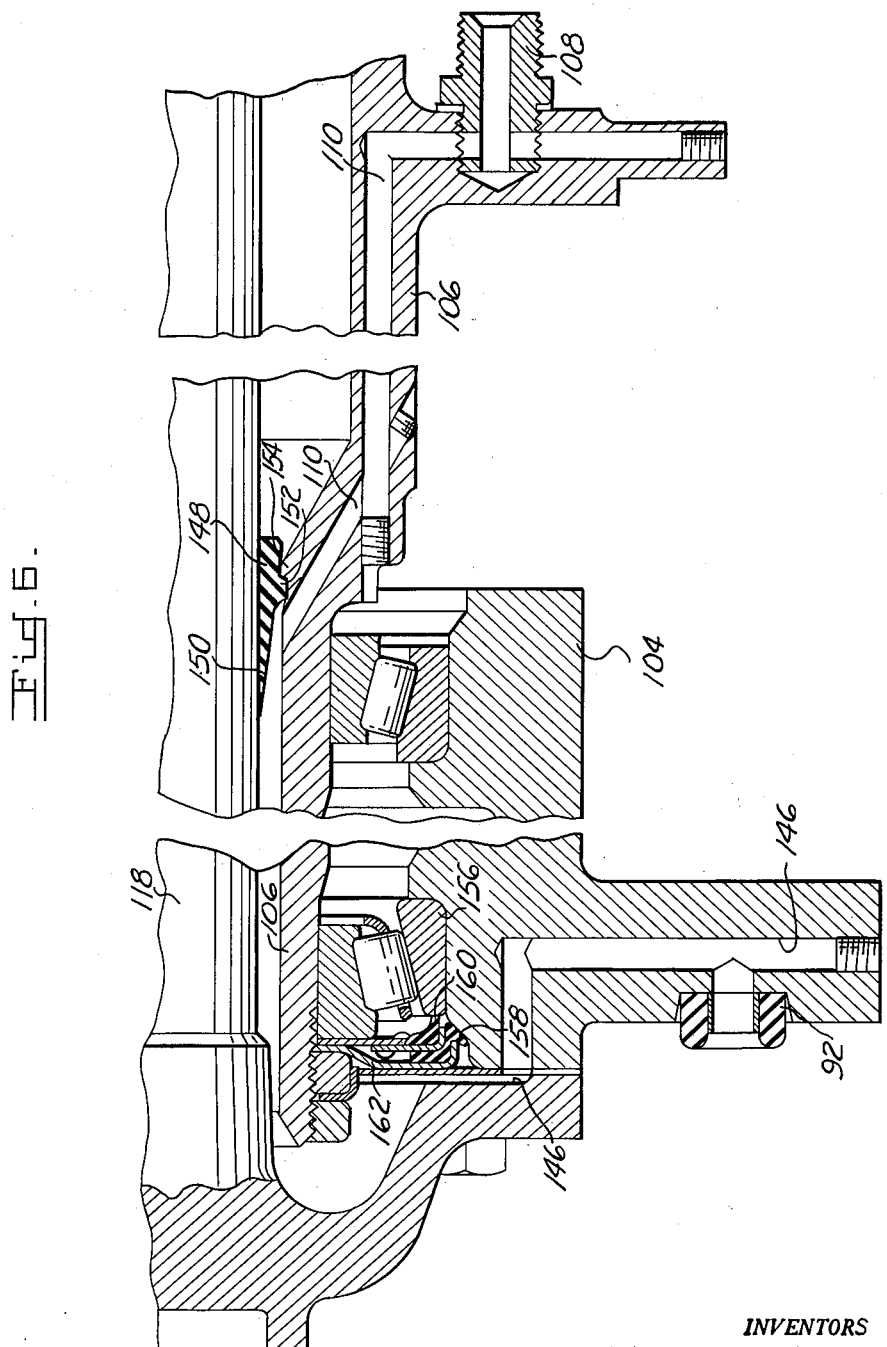

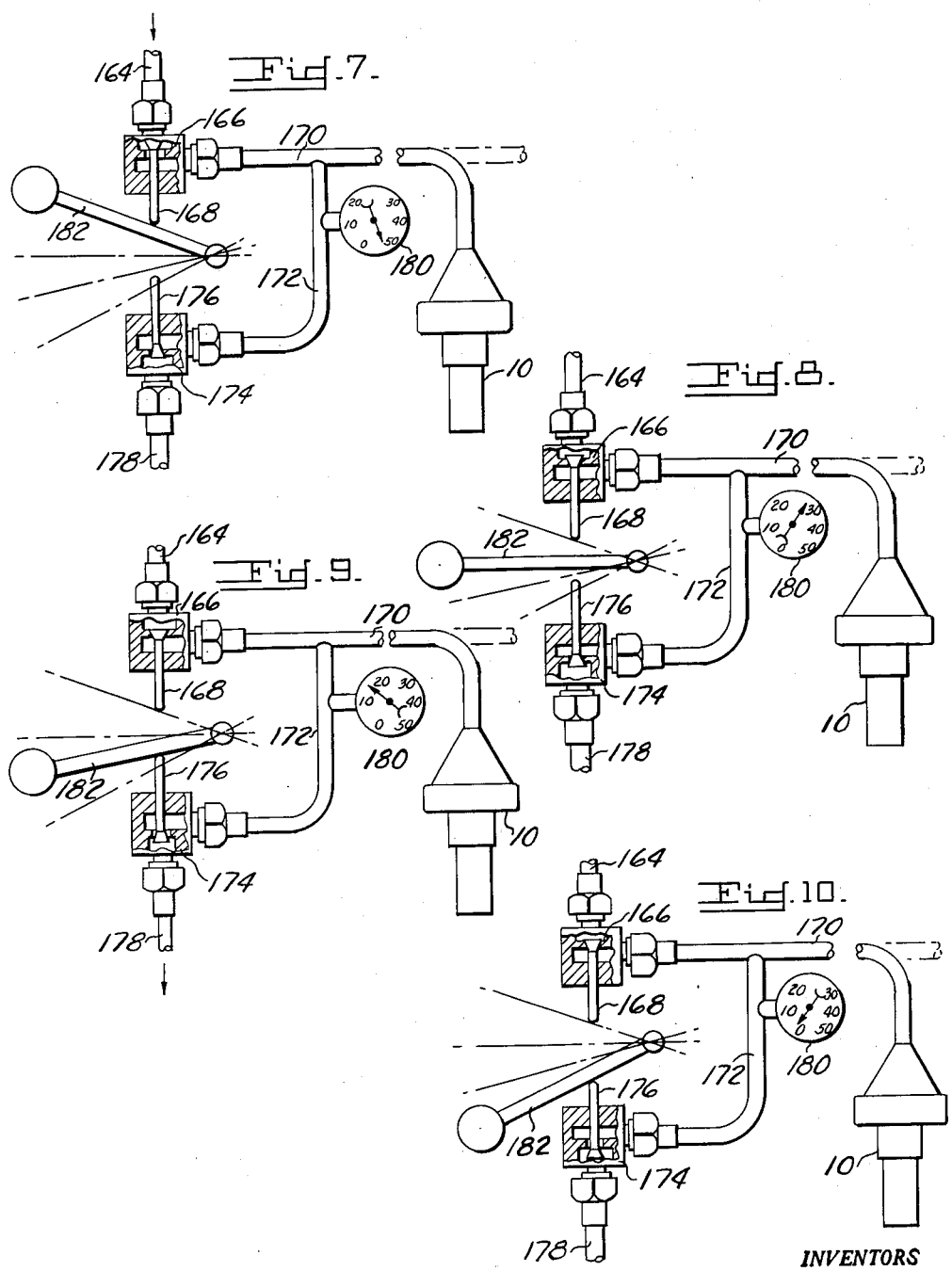

2,976,906

TIRE PRESSURE CONTROL DEVICE

Wunibald I. E. Kamm, Stuttgart, Germany, Kurt Staiger, Indianapolis, Ind., and Willy F. Krautter, Portland, Pa., assignors to the United States of America as represented by the Secretary of the Army Original application Sept. 10, 1958, Ser. No. 760,277, now Patent No. 2,944,579, dated July 12, 1960. Divided and this application Nov. 3, 1959, Ser. No. 856,884

5 Claims. (Cl. 152—417)

(Granted under Title 35, U.S. Code (1952), sec. 266)

The invention relates to improvements in tire pressure controls, particularly tire pressure controls of the centrally regulated type whereby the tires of a vehicle may be inflated or deflated during operation of the vehicle.

This application is a division of our original application Serial No. 760,277 filed September 10, 1958, now issued as U.S. Patent No. 2,944,579 dated July 12, 1960, for Tire Pressure Control Device.

It is well known that the traction of vehicles on soft terrain may be greatly improved by decreasing the pressure within the tires thereby increasing the tire supporting surface, and also that a decreased tire pressure will provide greater riding comfort on rough roads. Conversely, high tire pressures decrease rolling resistance and tire carcass temperatures on smooth roads thereby increasing economy and safety. Therefore, means have been proposed for changing the tire pressure in accordance with the type of surface upon which the vehicle is travelling, and many of these means are of the type which permit the tire pressure to be regulated while the vehicle is in motion.

One of these arrangements provides for connecting the tire tube directly to a controllable compressed air source within the vehicle by means of conduits and sealing structure between the axles and hubs. The primary disadvantage of this system lies in the fact that holding the tire pressure depends on the efficiency of the sealing structure, and, as the seals are subject to wear, it is very difficult to maintain an effective seal at all times. Also, there is the danger of the tires collapsing if the sealing system or compressed air source should completely fail.

Another tire pressure control arrangement provides for a system of double conduits and double sealing boxes on each wheel connected to a special tire valve whereby compressed air within one conduit opens or closes the valve while the air flowing through the other conduit inflates or deflates the tire. Although this system prevents the air within the tires from escaping due to leaks in the sealing boxes, the use of double conduits, double sealing boxes and double controls make the system complicated and expensive.

A more practical arrangement, which eliminates the disadvantages of the above systems, uses a single conduit for both opening and closing the tire valve and inflating or deflating the tire tube by leaving the tire tube check valve within the valve stem rendering the tire pressure independent of leaks anywhere in the system. This system employs a differential piston or diaphragm placed on the tire stem in operative engagement with the tube check valve. The sides of the differential piston are in fluid connection such that air pressure applied to one side of the piston will also be applied to the other side of the piston, however, the difference in piston area will cause the piston to move, thereby opening the check valve. The tire may be inflated by using a higher air pressure within the feeding line than is present in the tire tube, and to deflate the tire it is necessary to charge the feeding line with a pressure less than the tire pressure. If all pressure is withdrawn from the feeding line, the spring in the check valve will seal the air within the tire. The primary disadvantages of this system are due to the check valve in the tire stem limiting the air flow, especially during deflation when there is little pressure difference between the piston and the tire tube, causing deflation to be too slow for many purposes. Also, the low pressure characteristics of this type of system are largely dependent on the strength of the check valve spring of each tire tube thereby producing uneven minimum tire pressures if the springs of the tires are not matched, as the check valve spring will close the check valve when the pressure exerted by the differential piston is less than that exerted by the spring.

The invention pertains to improvements in the last mentioned type tire pressure control system whereby improved operational characteristics are produced.

An object of the invention is to produce a tire pressure control system wherein inflation and deflation of the tire is rapidly achieved.

A further object of the invention is to design a tire operating valve wherein the opening mechanism and check valve comprise a single unit.

Another object of the invention is to produce a combined opening and check valve which is economical to manufacture and may be mounted on any tire stem without modification to the stem.

Yet another object of the invention is to produce a combined opening and check valve structure wherein the spring and area of the valve are of such valves as to constitute safety features to prevent the tires from being deflated beyond safe operating conditions.

Another object of the invention is to design air transition and sealing means which are long lasting, highly efficient and are economical to produce and maintain.

These and other objects of the invention will become apparent from the following specification and drawings wherein.

Fig. 1 is a cross-section elevation of a combination valve utilized by the tire control system.

Fig. 2 is a cross-section elevation of a modification of combination valve.

Fig. 3 is a cross-section of a type of sealing means used with non-driving wheels employing the tire control system.

Figs. 4, 5 and 6 disclose various types of sealing means used with driving wheels employing the tire control system of the invention.

Fig. 7 is a schematic view of the control lever and valves in the inflating position.

Fig. 8 is a schematic view of the control lever and valves in the pressure reading position.

Fig. 9 is a schematic view of the control lever and valves in the deflating position.

Fig. 10 is a schematic view of the control lever and valves in the exhausting position.

The invention may be used with any type of pneumatic tired vehicle, and in the illustrated embodiment a form of opening and check combination valve is shown at 10, which is of the type utilized with the invention. Valve 10 consists of a housing comprised of an upper portion 12 formed to a lower portion 14. Portion 12 is provided with an extending nipple 16 onto which a feed or pressure line may be connected, the valve 10 may be threaded to the top of a tire tube valve stem 15 by means of threaded orifice 18. Before the valve 10 is attached to the valve stem, the valve stem check valve must be removed whereupon the orifice 18 is screwed upon the valve stem until the stem engages sealing ring 20 to form an airtight connection.

A differential piston 22 is supported within combination valve 10 and consists of a large diaphragm 24 and a small diaphragm 26 which are centrally held together by a tubular rivet type fastener 28 acting on washers 30 and 32. A spacer 34 maintains the diaphragms 24 and 26 in spaced relation while the bore 36 will permit equal air pressure on both sides of piston 22. The periphery of the diaphragms 24 and 26 are spaced by a sheet metal spacer 38 and held in place by housing portions 12 and 14, which are assembled by folding under lip 40. A vent 42 opens into the space 44 to prevent inconsistent performance due to air leaking into space 44 and building up a pressure.

A valve seat support 46 is also held in place by the assembling of housing portions 12 and 14 and is formed with a valve seat 48, which is part of the check valve structure. A guide bracket 50 is mounted within housing portion 14 and serves to guide stem 52 which carries spring 54 biasing check valve 56 in engagement with valve seat 48. A contact 58 extends from the upper end of stem 52 for engagement with piston 22 and is formed with air passages therein. The area of the air passages in fastener 28, contact 58, support 46, bracket 50 and ring 20 are all greater than the area of the air passage of the tire tube valve stem 15, therefore, the rate of flow of air is limited by the tube stem rather than the combination valve 10.

The operation of combination valve 10 is as follows:

After the valve stem check valve has been removed, valve 10 is threaded onto the valve stem 15, and a source of compressed air is attached to nipple 16. To inflate the tire an air pressure greater than that of the pressure within the tire is introduced into valve 10. The air will flow to both sides of piston 22, and, since the area of diaphragm 24 is greater than that of diaphragm 26, the piston 22 will move downwardly toward contact 58. As contact 58 is displaced, the check valve 56 will be opened permitting the air to flow into the tire. When the desired tire pressure is obtained, the pressure of the air being introduced into valve 10 from the compressed air source is reduced to atmospheric pressure by exhaust to the atmosphere as hereinafter described so as to return the pressure within valve 10 to atmospheric, thereupon the spring 54 will close check valve 56 and the pressure within the tire acting upon the area 60 of check valve 56 will keep check valve 56 seated.

When it is desired to deflate the tire, air is introduced into valve 10 through nipple 16 at a pressure less than that of the tire but greater than atmospheric pressure whereby the large pressure area of diaphragm 24 will cause check valve 56 to be opened, since the pressure within valve 10 is less than that of the tire, the air will flow to the lower pressure differential deflating the tire.

The spring 54 and area 60 are constructed such that when the air within the tire reaches the minimum safe operating pressure the check valve 56 will be closed and held shut even through there is pressurized air within valve 10. This is due to the pressure exerted by spring 54 and that of the air within the tire on area 60 being greater than the differential pressure exerted on piston 22 by the air from the compressed air source. This construction is especially important where one of the tires of the vehicle is leaking. Under these conditions the reduced pressure within the leaking tire reduces the force required to open the check valve 56 permitting air to be introduced into the leaking tire without disturbing the pressure of the remaining tires. This would permit the leaking tire to share part of the vehicle load and prevent overloading the other tires until repairs can be made. This feature provides an effective safety measure not possible when the check valve is within the valve stem.

A modification of the combination valve is shown in Fig. 2 wherein the operation is the same as in valve 10 of Fig. 1, however, a few structural design changes are present. Combination valve 10' comprises housing portions 12' and 14' which encompass a piston 22' which is composed of diaphragms 24' and 26' which are formed of a single piece of material; contact 58' is carried by piston 22' and upon piston deflection is adapted to engage check valve 56'. Check valve 56' is biased and guided in the same manner as the check valve 56 of Fig. 1. Valve seal 62 contacts valve seat 48' which consists of an annular lip depending from support 46'. The construction of the check valve 56' and valve seat 48' of this modification minimize any tendency of the valve to stick and provide a very accurate and sensitive combination valve although this modification would be more expensive to manufacture than the valve of Fig. 1.

Figs. 3 through 6 illustrate various modifications of sealing means used to conduct the air from the compressed air source to the rotating wheel and tire.

The embodiment of Fig. 3 illustrates means for conducting air to a non-driving wheel wherein wheel hub 64 is rotatably mounted on axle 66 by means of anti-friction bearings 68. The air is conducted through the axle, via conduits 70, which are connected to the compressed air source and terminate in orifice 72 which opens onto the surface of axle 66.

An annular recess 74 within hub 64 contains the sealing means 75 which is comprised of concentric tubular sleeves 76 and 78 held in spaced relation by spacers 80. Tube 82 provides an air passage through sleeves 76 and 78; rubber lip rings 84, which are mounted to sleeve 78, provide the immediate seal between the hub 64 and axle 66. Lip rings 84 are inclined toward orifice 72 such that the air pressure will cause rings 84 to be pressed against axle 66 and maintain a tight sealing action. Resilient sealing rings 86 are held in place by retaining clip 88 and enclose recess 74 and ring 76 thereby creating an airtight chamber 90 except for passageways 82 and 91 which allow the compressed air to pass through chamber 90 on its way to coupling 92.

The air is conducted from chamber 90 to coupling 92, via conduits 94, whereupon the air will be transferred to the wheel 96 and to the combination valve 10 through conduit 98. Coupling 92 may consist of a rubber sleeve 100 into which a nipple 102, supported by wheel 96, may be fitted. Thus, the valve 10 will be in communication with a compressed air source when the wheel 96 is bolted to hub 64.

Fig. 4 discloses one type of sealing structure which may be used with a driving wheel, wherein a hub 104 rotates about axle housing 106. A fitting 108 permits an air hose to be attached thereto such that air may flow through conduit 110 to seal 112. Seal 112 is composed of tubular rings 114 and 116 which surround axle 118 and support a lip ring 120. Passages 122 permit a flow of air through the rings 114 and 116 to the void between axle 118 and housing 106. Sealing rings 124 position seal 112 and together with lip ring 120 prevent air from escaping to the differential. The end of housing 106 is sealed by an annular rubber gasket 126 which has a lip 128 formed thereon which will be pressed against the housing wall by air pressure within housing 106. A hole 130 is bored in housing 106 to permit communication from the void between axle 118 and housing 106 and sealing means 75, which is of the type disclosed in Fig. 3. From seal 75 the air will travel through conduit 132 to the wheel as shown in Fig. 3.

A modification of sealing means for a drive wheel is shown in Fig. 5 where the axle housing 106 rotatably supports wheel hub 104. Air is introduced into seal 112 in the same manner as in the construction of Fig. 4, however, the air is prevented from escaping through the hub bearings by means of lip seal 134 and O ring 136 which are held in place by cover 138. Cover 138 is threaded as at 140 and may be longitudinally positioned by operating nut 142 which is rotatably mounted on support 144. The air is thus prevented from leaking through the bearings and is fed, via conduits 146, to coupling 92.

Another seal modification is disclosed for a driving wheel in Fig. 6. The air is fed through the axle housing 106 by means of fitting 108 and conduits 110 and is prevented from escaping to the differential by annular sealing ring 148. Seal ring 148 is made of a resilient material and is formed with a lip 150 and shoulder 152 such that the seal 148 is held in place by the engagement of housing shoulder 154 with shoulder 152, and the air pressure surrounding axle 118 will cause lip 150 to cling to axle 118 forming an airtight seal. The resilient character of ring 148 will bias the lip 150 away from the axle 118 when the system is not under pressure thereby keeping wear to a minimum. Bearing 156 is rendered airtight by means of a seal 158. Seal 158 is also of the lip type and is mounted adjacent oil seal 160 by a sheet metal cover 162. Conduits 146 carry the air through hub 104 to coupling 92 as in Fig. 5.

Figs. 7 through 10 illustrate the control valves for regulating the flow of air in various positions of operation and will be explained in operational sequence.

Fig. 7 discloses the inflation operation wherein conduit 164 supplies air from the compressed air source to a variable flow intake valve 166 controllable by stem 168. Conduits 170 and 172 connect valve 166 to variable flow exhaust valve 174, which is operated by stem 176, whereby air may be exhausted to the atmosphere, via conduit 178. A pressure gage 180 is included in the system and is affixed to conduit 172 while conduit 170 provides the connection to the combination tire valves 10, one of which is shown. A manually operable pivotally mounted lever 182 may be used to actuate stems 168 and 176.

When the handle 182 is raised, as in Fig. 7, stem 168 will be depressed pressurizing the system, causing the differential piston 22 of the combination valves 10 to open the check valve 56, permitting air to flow into the tires, inflating them.

During inflation it is necessary to check the pressure within the tires to prevent over-inflation. Gaging is accomplished by moving handle 182 to the position shown in Fig. 8. In such case both valves 166 and 174 are closed and the static pressure within conduits 170 and 172 will be that equal to the pressure of the tires as the pressure within conduit 170 and valve 10 will hold the check valves 56 open. The pressure within the tires may now be read from gage 180.

Should the pressure within the tires be higher than that desired, the tires may be deflated by moving handle 182 to the position illustrated in Fig. 9. During the deflation operation exhaust valve 174 is only partially opened whereby air pressure within conduit 170 and valve 10 is slowly relieved. As explained previously, a reduced pressure in valve 10 will hold check valve 56 open as long as the difference in force exerted on diaphragms 24 and 26 is greater than the force exerted by spring 54, therefore, the air pressure within conduit 170 and 172 may be less than the pressure of the tires and yet hold the valve 56 open. Because of the greater tire pressure, the air will flow from the tire through valve 174 and be exhausted into the air until valve 174 is closed or the pressure within conduit 170 and valve 10 reaches the point where the differential pressure acting on piston 22 can no longer counteract the force of spring 54 at which time the check valve 56 will close and the tire will be sealed. As the conduits 170 and 172 are usually completely void of pressurized air except when the tire pressure control system is in operation, it is necessary to raise handle 182 to the inflating position to pressurize the system and open valves 56 before the deflation operation can be performed.

When the proper air pressure has been achieved in the tires, the handle 182 is moved to the position shown in Fig. 10. In this position the stem 176 of exhaust valve 174 will be fully depressed allowing any pressurized air within conduits 170, 172 or valve 10 to be exhausted to the atmosphere. The lack of air pressure within combination valve 10, as the system is exhausted, will permit check valve 56 to close under the influence of spring 54 thereby holding the tire pressure.

The vehicle will normally be operated while the system is exhausted thereby permitting the sealing lips of seal rings 84, 134 and 148 to retract from engagement with the axle or axle housing, due to the resilient nature of the ring, thereby preventing unnecessary wear of the sealing means.

It is therefore seen that the invention discloses a simplified tire pressure control system wherein the tires may be inflated or deflated from a single conduit and that the tire is sealed from the control system except during operation of the system, thus leaks in the conduits or seals will not affect the tire pressure.

The integration of the check valve with the opening and closing piston structure achieves accurate and consistent performance at each tire as the area of the check valve and strength of the closing spring may be accurately maintained and will not vary with each tire. Also, the dimensions of the combination valve air passages are greater than the core of tire valve stem thereby permitting the maximum possible flow of air into or out of the tire.

The use of lip type seals has special advantage with the disclosed system as the lips may be constructed so as to engage the moving element only when compressed air is introduced into the seal, therefore, as the control system of the invention is pressurized only when the tires are being inflated or deflated, the seals will be subject to wear for a minimum length of time.

It is understood that various modifications may be apparent to those skilled in the art without departing from the spirit and scope of the invention, and the invention is not to be limited to the illustrated embodiments except as included in the appending claims.

We claim:

1. In a tire pressure control system for a vehicle mounting an axle and a wheel hub rotatable thereon; a conduit formed in said axle terminating in an orifice formed in the surface thereof, sealing structure contained within a recess of said wheel hub, said sealing structure including a set of annular sealing rings encompassing said axle and axially positioned on both sides of said orifice, lips formed on said sealing rings projecting toward said orifice, holding rings positioning said sealing structure within said recess, a coupling within the wheel supporting flange of said hub and a conduit connecting said coupling with said recess whereby compressed gas may flow through said axle to said coupling.

2. In a tire pressure control system for a vehicle mounting an axle and a wheel hub rotatable thereon; a conduit formed in said axle terminating in an orifice formed in the surface thereof, sealing structure contained within a recess of said wheel hub, said sealing structure including a pair of spaced concentric outer and inner sleeves encircling said axle, a passage through said sleeves, a series of sealing rings carried by the inner sleeve encircling the axle and axially positioned on both sides of said orifice, resilient lips formed on said sealing rings projecting toward said orifice, holding rings interposed between said outer sleeve and said recess, a coupling within the wheel supporting flange of said hub and a conduit connecting said coupling with said recess whereby compressed gas may flow through said axle to said coupling.

3. In a tire pressure control system for a vehicle mounting an axle, an axle housing and a wheel hub rotatable upon said housing; a conduit extending through the axle housing, a first seal interposed between the axle housing and the axle, said seal being formed with a resilient lip in close proximity to the axle, a second seal interposed between said axle and the end of said axle housing, a hole in said axle housing, a third seal carried within a recess in said wheel hub adapted to engage said axle housing and enclose the area adjacent said hole, a coupling within the wheel mounting flange of said hub and conduits means within said hub connecting said coupling with said recess whereby pressurized gas may be conducted from said axle housing to said coupling.

4. In a tire pressure control system for a vehicle mounting an axle, an axle housing, and a wheel hub rotatably mounted upon said axle housing by means of oil sealed bearings; a conduit within said axle housing, an annular resilient seal interposed between said axle and axle housing, an elongated lip formed on said seal and extending parallel to said axle in close proximity thereto, a shoulder formed on said seal adapted to engage a shoulder formed on said axle housing, a second resilient seal fixed to the oil seal of said bearings, a lip formed on said second seal, a coupling within the wheel mounting flange of said hub and a conduit connecting said coupling with the inside of said hub whereby compressed gas may be conducted through said axle housing to said coupling.

5. In a tire pressure control system for a vehicle having a non-driving wheel hub rotatably mounted on a first axle and a driving wheel hub rotatably mounted on a spaced housing of a second axle, a first conduit formed in said first axle terminating in an orifice formed in the surface thereof, sealing structure contained within a recess of said non-driving wheel hub, said sealing structure including a set of annular sealing rings encompassing said first axle and axially positioned on both sides of said orifice lips formed on said sealing rings projecting toward said orifice, holding rings positioning said sealing structure within said recess, a coupling within a wheel supporting flange of said non-driving wheel hub, a second conduit connecting said coupling with said recess, a third conduit extending through said housing of said second axle, a first seal interposed between said housing and said second axle, said first seal being formed with a resilient lip in close proximity to said second axle, a second seal interposed between said second axle and the end of said housing, a hole in said housing, a third seal carried within a recess in said driving wheel hub adapted to engage said housing and enclose an area adjacent said hole, a second coupling within a wheel supporting flange of said driving wheel hub, and conduit means within said driving wheel hub connecting said second coupling with the last mentioned said recess, whereby pressurized gas may be conducted through said first axle and said housing of said second axle to the respective ones of said first and second couplings.

References Cited in the file of this patent
UNITED STATES PATENTS

| | | |
|---|---|---|
| 1,040,643 | Darnley | Oct. 8, 1912 |
| 1,657,023 | Mitchell et al. | Jan. 24, 1928 |
| 1,800,780 | Daneel | Apr. 31, 1931 |